US009395726B1

(12) United States Patent
Rizzi et al.

(10) Patent No.: US 9,395,726 B1
(45) Date of Patent: Jul. 19, 2016

(54) METHODS AND DEVICES FOR BOUND AND GALLOP GAITS

(71) Applicant: Google Inc., Mountain View, CA (US)

(72) Inventors: Alfred Anthony Rizzi, Mountain View, CA (US); Alex Khripin, Mountain View, CA (US); Michael Scott Rose, Mountain View, CA (US); Gina Fay, Mountain View, CA (US); Stephen Berard, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/573,092

(22) Filed: Dec. 17, 2014

Related U.S. Application Data

(60) Provisional application No. 62/028,600, filed on Jul. 24, 2014.

(51) Int. Cl.
*G06F 19/00* (2011.01)
*G05D 1/02* (2006.01)
*B62D 57/02* (2006.01)

(52) U.S. Cl.
CPC ............... *G05D 1/021* (2013.01); *B62D 57/02* (2013.01); *Y10S 901/01* (2013.01)

(58) Field of Classification Search
CPC ...... B62D 57/032; B62D 57/02; A63H 11/18; B25J 9/1664; G05B 2219/40264; G06N 3/04
USPC .............................................. 700/245; 901/1
See application file for complete search history.

(56) References Cited

U.S. PATENT DOCUMENTS

| 5,842,533 | A | 12/1998 | Takeuchi |
| 6,484,068 | B1 | 11/2002 | Yamamoto |
| 7,339,340 | B2 | 3/2008 | Summer |
| 8,457,830 | B2 | 6/2013 | Goulding |
| 8,630,763 | B2 | 1/2014 | Goulding |
| 2008/0208391 | A1* | 8/2008 | Hasegawa ............ B62D 57/032 700/245 |
| 2008/0281468 | A1 | 11/2008 | Jacobsen |
| 2009/0182697 | A1* | 7/2009 | Massaquoi ............... G06N 3/04 706/44 |

* cited by examiner

*Primary Examiner* — Nga X Nguyen
(74) *Attorney, Agent, or Firm* — McDonnell Boehnen Hulbert & Berghoff LLP

(57) ABSTRACT

Examples for implementing bound and gallop gaits are described herein. A computing system may receive an input for a robotic device to perform a gallop gait or a bound gait. Responsive to receiving the input, the computing system may determine a state of the robotic device based on sensor data monitoring the robotic legs. A sagittal controller of the robotic device may determine vertical impulses and target locations for controlling the legs during the gallop gait based on a pitch, a height, and a velocity of the robotic device. One or more continuous controllers may determine adjustments for controlling the legs based on a roll, a yaw, and/or lateral motions of the robotic device that may result from the robotic device traveling at the velocity and direction as specified in the input. Further, to perform the gait, the controllers may provide instructions to control the legs.

20 Claims, 9 Drawing Sheets

METHODS AND DEVICES FOR BOUND AND GALLOP GAITS

CROSS-REFERENCES TO RELATED APPLICATIONS

The present application claims priority to U.S. Provisional patent application Ser. No. 62/028,600, filed Jul. 24, 2014, and entitled "Methods and Devices for Bound and Gallop Gaits," the entire contents of which are herein incorporated by reference.

STATEMENT REGARDING FEDERALLY SPONSORED RESEARCH OR DEVELOPMENT

This invention was made with government support under Contract Numbers W91CRB-11-C-0048 awarded by Defense Advanced Research Project Agency (DARPA). Accordingly, the government has certain rights in the invention.

BACKGROUND

Unless otherwise indicated herein, the materials described in this section are not prior art to the claims in this application and are not admitted to be prior art by inclusion in this section.

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and more intuitive. As robotic systems become increasingly prevalent in numerous aspects of modern life, the desire for efficient robotic systems becomes apparent. Therefore, a demand for efficient robotic systems has helped open up a field of innovation in actuators, movement, sensing techniques, as well as component design and assembly. Robotic systems are being expected to move and operate efficiently to perform new tasks and functions.

SUMMARY

Example implementations may relate to use of bound and gallop gaits within robotic devices. As an example robotic device navigates, the robotic device may be configured to perform gaits (e.g., mechanics for enabling travel) that cause the robotic device to move at desired speeds. The robotic device may be configured to perform a bound gait and a gallop gait using different components configured to enable the execution of the gaits.

In one example, the present application describes a method for operating a robotic device by a plurality of decoupled controllers of the robotic device including a discrete sagittal controller, a frontal model controller, and a turning controller. The method may comprise receiving, at a computing system of the robotic device having a plurality of extendable legs, an input for the robotic device to perform a bound gait comprising a plurality of recurring gait stages that define respective positions for the extendable legs operating in predefined pairs. The input may indicate a velocity and direction of motion for the robotic device to travel. Additionally, the method may include, responsive to receiving the input, determining a state of the robotic device based on sensor data indicative of operation of the extendable legs. The method may include determining, by the discrete sagittal controller, vertical impulses and target locations for controlling the extendable legs during the bound gait based on a pitch, a height, and a velocity of the robotic device. The target locations may correspond to respective locations on a surface for landing the extendable legs. Furthermore, the method may also include determining, by the frontal model controller, one or more adjustments for controlling the extendable legs during the bound gait based on one or more lateral forces associated with a roll of the robotic device resulting from the robotic device traveling at the velocity and direction of motion according to the input and modifying, by the turning controller, the target locations for controlling the extendable legs during the bound gait based on a yaw and a lateral motion of the robotic device resulting from the robotic device traveling at the velocity and direction of motion according to the input. The method may additionally include, based on the state of the robotic device and the input, the plurality of decoupled controllers providing instructions to control the extendable legs operating in the predefined pairs to perform the bound gait.

In another example, the present application describes a second method for operating a robotic device by a plurality of decoupled controllers of the robotic device including a discrete sagittal controller and a lateral controller. The second method may comprise receiving, at a computing system of the robotic device having a plurality of extendable legs, an input for the robotic device to perform a gallop gait comprising a plurality of recurring gait stages that define respective positions for the extendable legs. The input may indicate a velocity and direction of motion for the robotic device to travel. Further, the second method may also include, responsive to receiving the input, determining a state of the robotic device based on sensor data indicative of operation of the extendable legs and determining, by the discrete sagittal controller, vertical impulses and target locations for controlling the extendable legs during the gallop gait based on a pitch, a height, and a velocity of the robotic device. The target locations may correspond to respective locations on a surface for landing the extendable legs. The second method may also include determining, by the lateral controller, one or more adjustments for controlling the extendable legs during the gallop gait based on lateral forces associated with a roll, a yaw, and lateral motions of the robotic device that may result from the robotic device traveling at the velocity and direction as specified in the input, and based on the state of the robotic device and the input, the plurality of decoupled controllers providing instructions to control the extendable legs to perform the gallop gait.

In another example, the present application describes a robotic device comprising a plurality of extendable legs, a sensor system for sensing operation of the extendable legs, and a computing system having a plurality of decoupled controllers including a discrete sagittal controller, a frontal model controller, and a turning controller. Additionally, the robotic device may include a memory having stored thereon instructions that, upon execution by at least one processor or the plurality of decoupled controllers, cause the computing system to perform functions. The functions may include receiving an input for the robotic device to perform a bound gait comprising a plurality of recurring gait stages that define respective positions for the extendable legs operating in predefined pairs. In some implementations, the input may indicate a velocity and direction of motion for the robotic device to travel. Additionally, the functions may include, responsive to receiving the input, determining a state of the robotic device based on sensor data indicative of operation of the extendable legs. The functions may also include determining, by the discrete sagittal controller, vertical impulses and target locations for controlling the extendable legs during the bound gait based on a pitch, a height, and a velocity of the robotic device. The target locations may correspond to respective locations on a surface for landing the extendable legs. Furthermore, the functions may include determining, by the frontal model controller, one or more adjustments for controlling the extendable legs during the bound gait based on one or more lateral forces associated with a roll of the robotic device resulting from the robotic device traveling at the velocity and direction of motion according to the input. The functions may also include modifying, by the turning controller, the target locations for controlling the extendable legs during the bound gait based on a yaw and a lateral motion of the robotic device resulting from the robotic device traveling at the velocity and direction of motion according to the input. In addition, the functions may include, based on the state of the robotic device and the input, the plurality of decoupled controllers providing instructions to control the extendable legs operating in the predefined pairs to perform the bound gait.

These as well as other aspects, advantages, and alternatives, will become apparent to those of ordinary skill in the art by reading the following detailed description, with reference where appropriate to the accompanying figures.

DETAILED DESCRIPTION

Figure 1:
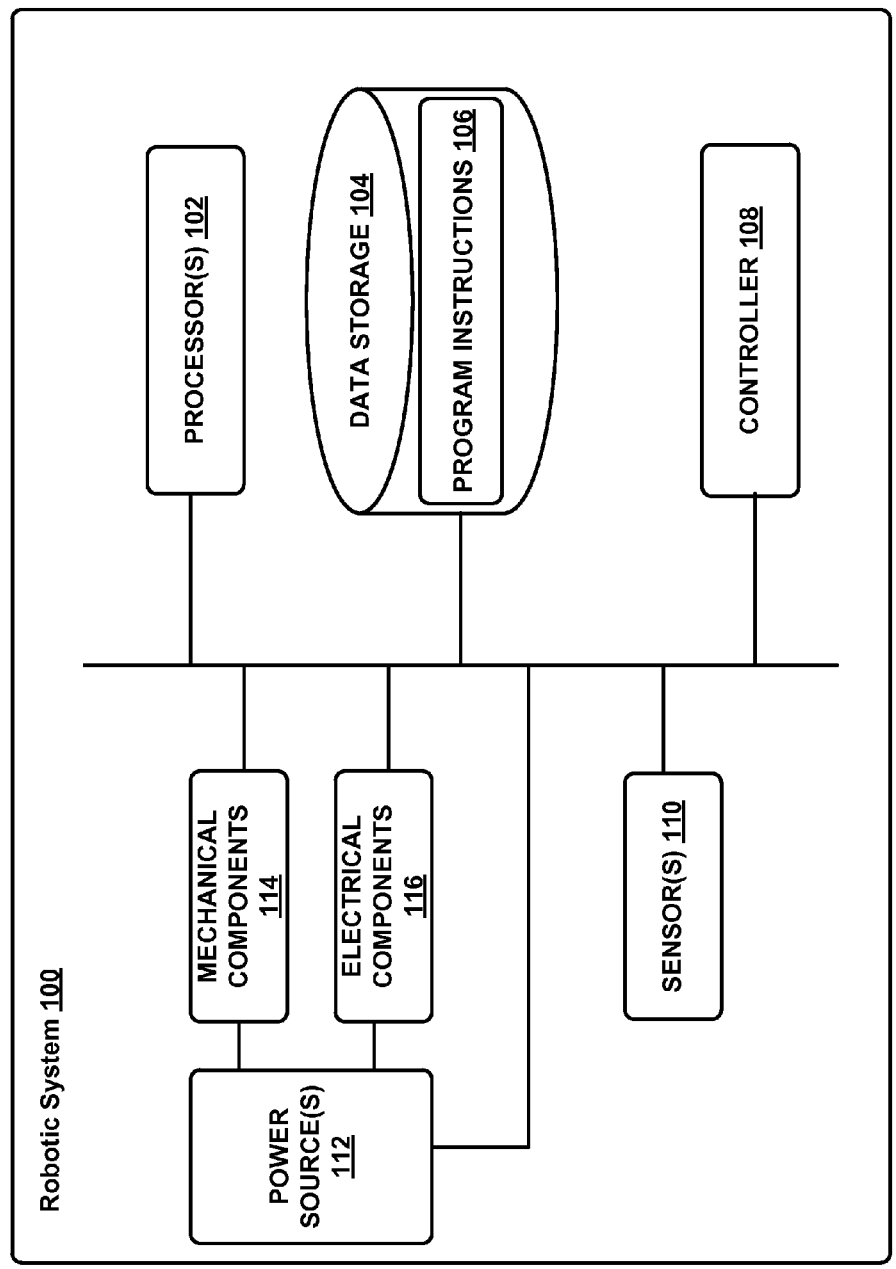
FIG. 1 illustrates a configuration of a robotic system, according to an example implementation.

The following detailed description describes various features and functions of the disclosed systems and methods with reference to the accompanying figures. The illustrative system and method implementations described herein are not meant to be limiting. It may be readily understood that certain aspects of the disclosed systems and methods can be arranged and combined in a wide variety of different configurations, all of which are contemplated herein.

Robotic devices may perform various operations, including executing gaits to travel at a range of desired speeds. A gait may represent mechanical operations for cycling legs of a robotic device to move in a desired direction. An example robotic device may be designed with features that enable the performance of variety of gaits. For example, a quadruped robotic device includes four legs for performing gaits similar to gaits performed by four legged animals, such as a bound gait and/or gallop gait.

As indicated above, a robotic device may travel at a range of speeds by performing a bound gait or a gallop gait. Execution of a bound gait may involve a control system of the robotic device operating the legs in contralateral (also described herein as predefined) pairs. Legs operating in a contralateral pair may move with matching motion. Unlike the bound gait, executing the gallop gait may involve the control system operating the legs independently from each other. Further, the gallop gait may involve the control system positioning at most, only one leg of the robotic device on the ground at a given time and alternating between which leg pushes off the ground to enable movement.

Similar to other possible gaits, the bound gait and the gallop gait may involve a series of recurring gait stages that a control system of the robotic device may cycle the positions of the robotic legs between and as a result, cause the robotic device to move. Cycling the legs through the positions at a faster rate may cause the robotic device to increase speed (e.g., accelerate). Among possible advantages, a bound gait and/or gallop gait may enable the robotic device to reach speeds and stability levels that other gaits may not enable, for example.

An example robotic device may be configured with a control system that may include multiple controllers configured to enable the performance of gaits, including the bound and gallop gaits. Among possible controllers, the robotic may include one or more sagittal controllers, turning controllers, lateral controllers, and/or frontal model controllers. Each controller may be configured to perform different operations related to the control and/or general operation of the robotic device during execution of a gait.

Further, the different controllers may operate within the robotic device in a decoupled configuration, which may enable the controllers to function independently from the other controllers. A decoupled configuration may involve the controllers performing different operations separate from the operations of other controllers, for example. In some example implementations, the robotic device may include communication means for the controllers to communicate with each other and/or share data. Additionally, the control system may control the legs and/or other features of the robotic device using data provided by the controllers.

In an example implementation, a robotic device may be configured with multiple decoupled controllers, including a discrete sagittal controller, a frontal model controller, and a turning controller that may assist with performing one or multiple gaits. In response to receiving an input requesting the robotic device to perform a bound gait, a computing system may determine a state of the robotic device. The state of the robotic device may be based on sensor data measuring operation of the extendable legs. In some instances, the input received by the robotic device may indicate a velocity and/or direction of motion for the robotic device to travel.

The controllers of the robotic device may perform various operations to enable the robotic device to perform the bound gait. A discrete sagittal controller may determine vertical impulses and/or target locations for controlling the legs during the bound gait based on one or more of a pitch, a height, and/or a velocity of the robotic device. As such, the target locations may correspond to locations in front of the robotic device on the surface for landing the legs.

Additionally, a frontal model controller of the robotic device may determine one or more adjustments for controlling the legs during the bound gait based on one or more lateral forces associated with a roll of the robotic device that may result from the robotic device traveling at the velocity and direction of motion according to the input.

Further, a turning controller of the robotic device may modify the target locations for controlling the legs during the bound gait based on a yaw and a lateral motion of the robotic device resulting from the robotic device traveling at the velocity and direction of motion according to the input. The different controllers, based on the state of the robotic device and the input, may provide instructions to control the extendable legs operating in the predefined pairs to perform the bound gait.

In other example implementations, a robotic device may be configured to operate with data provided from various decoupled controllers, including a discrete sagittal controller and a lateral controller. The robotic device may receive an input for to perform a gallop gait, which may indicate a velocity and direction of motion for the robotic device to travel.

Similar to the bound gait, a computing system of the robotic device may determine a state of the robotic device. The state of the robotic device may include information relating to available power for the robotic device, operation of the legs, stability, momentum of the robotic device, among other possible factors.

The gallop gait may also involve the controllers of the robotic device performing various operations. The discrete sagittal controller may determine vertical impulses and target locations for controlling the legs during the gallop gait based on a pitch, a height, and a velocity of the robotic device. Additionally, the lateral controller may determine one or more adjustments for controlling the legs during the gallop gait based on lateral forces associated with the roll, the yaw, and lateral motions of the robotic device that may result from the robotic device traveling at the velocity and direction as specified in the input.

Further, the controllers may, based on the state of the robotic device and the input, provide instructions to control the extendable legs to perform the gallop gait. The instructions may be provided to a control system and/or navigation system of the robotic device for implementing the gallop gait according to the parameters within the input, for example. The instructions may include other information as well.

In another example implementation, a robotic device may operate based on instructions provided by a single control system, which may include one controller configured to perform multiple operations. The single controller may be configured to perform the variety of operations that the various controllers described above may be configured to perform in other examples.

Referring now to the figures, FIG. 1 illustrates an example configuration or block diagram of a robotic system, according to an example implementation. The robotic system 100 represents an example robotic system configured to perform the methods and other possible operations described herein. Further, the robotic system 100 may be configured to operate autonomously, semi-autonomously, and/or using directions provided by user(s), and may exist in various forms, such as a humanoid robot or a quadruped robot, among other examples. Furthermore, the robotic system 100 may also be referred to as a robotic device, mobile robot, or robot, among others.

As shown in FIG. 1, the robotic system 100 includes processor(s) 102, data storage 104, program instructions 106, controller(s) 108, sensor(s) 110, power source(s) 112, mechanical components 114, and electrical components 116. Note that the robotic system 100 is shown for illustration purposes as robotic system 100 and may include more or less components within examples without departing from the scope of the invention. The various components of robotic system 100 may be connected in any manner, including wired or wireless connections, etc. Further, in some examples, components of the robotic system 100 may be positioned on multiple entities rather on a single entity. Other example illustrations of robotic system 100 may exist as well.

Processor(s) 102 may operate as a general-purpose processor or a special purpose processor (e.g., digital signal processors, application specific integrated circuits, etc.). The processor(s) 102 can be configured to execute computer-readable program instructions 106 that are stored in the data storage 104 and are executable to provide the functionality of the robotic system 100 described herein. For instance, the program instructions 106 may be executable to provide functionality of controller 108, where the controller 108 may be configured to cause activation and deactivation of the mechanical components 114 and the electrical components 116. The processor(s) 102 may operate and enable the robotic system 100 to perform various operations, including the operations described herein. Additionally, in some example implementations, the process(s) 102 may operate within a computing system of the robotic device, which may also be described as a control system. Other examples of processor(s) 102 may exist as well.

The data storage 104 may exist as various types of storage configured to hold memory. For example, the data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some implementations, the data storage 104 can be implemented using a single physical device (e.g., one optical, magnetic, organic or other memory or disc storage unit), while in other implementations, the data storage 104 can be implemented using two or more physical devices, which may communicate via wired or wireless communication. Further, in addition to the computer-readable program instructions 106, the data storage 104 may include additional data such as diagnostic data, among other possibilities.

The robotic system 100 includes at least one controller 108, which may interface with the robotic system 100. The controller 108 may serve as a link between portions of the robotic system 100, such as a link between mechanical components 114 and/or electrical components 116. The controller 108 may perform other functions for the robotic system 100 as well. The controller 108 may include one or multiple processor(s) 102, for example.

Among possible controller(s) 108, the robotic device may include one or multiple controllers, which may include sagittal controller(s), turning controller(s), lateral controller(s), and/or frontal model controller(s). Each controller may be configured to perform different operation of the robotic device. For example, a sagittal controller of a robotic device may determine vertical impulses and/or target locations for placing legs on the surface during the performance of a gait. A turning controller may perform measurements and/or control operations for the robotic device during the execution of turns, for example. Other examples of controller(s) 108 may exist.

Additionally, the robotic system 100 includes one or more sensor(s) 110 such as force sensors, proximity sensors, motion sensors, load sensors, position sensors, touch sensor, depth sensors, ultrasonic range sensors, and infrared sensors, among other possibilities. The sensor(s) 110 may provide sensor data to the processor(s) 102 to allow for appropriate interaction of the robotic system 100 with the environment as well as monitoring of operation of the systems of the robotic system 100. The sensor data may be used in evaluation of various factors for activation and deactivation of mechanical components 114 and electrical components 116 by controller 108 and/or a computing system of the robotic system 100.

The sensor(s) 110 may provide information indicative of the environment of the robotic device for the controller 108 and/or computing system to use to determine operations for the robotic system 100. For example, the sensor(s) 110 may capture data corresponding to the terrain of the environment or location of nearby objects, which may assist with environment recognition and navigation, etc. In one example configuration, the robotic system 100 may include a sensor system that includes RADAR, LIDAR, a global positioning system (GPS), and/or other sensors for capturing information of the environment of the robotic system 100. The sensor(s) 110 may monitor the environment in real-time and detect obstacles, elements of the terrain, weather conditions, temperature, and/or other parameters of the environment for the robotic system 100.

Further, the robotic system 100 may include other sensor(s) 110 configured to receive information indicative of the state of the robotic system 100, including sensor(s) 110 that may monitor the state of the various components of the robotic system 100. The sensor(s) 110 may measure activity of systems of the robotic system 100 and receive information based on the operation of the various features of the robotic system 100, such the operation of extendable legs, arms, or other mechanical and/or electrical features of the robotic system 100. The sensor data provided by the sensors may enable the computing system of the robotic system 100 to determine errors in operation as well as monitor overall functioning of components of the robotic system 100. For example, the computing system may use sensor data to determine a stability of the robotic system 100 during operations as well as measurements related to power levels, communication activities, components that require repair, among other information.

As one example configuration, the robotic system 100 may include gyroscope(s), accelerometer(s), and/or other possible sensors to provide sensor data relating to the state of operation of the robotic device. These sensors may measure the momentum, speed, orientation, direction, and/or other parameters associated with the stability, positioning, and/or movement of the robotic system 100. Further, sensor(s) 110 may also monitor the current state of a function, such as a gait, that the robotic system 100 may currently be operating. Other example uses for the sensor(s) 110 may exist as well.

Additionally, the robotic system 100 may also include one or more power source(s) 112 configured to supply power to various components of the robotic system 100. Among possible power systems, the robotic system 100 may include a hydraulic system, electrical system, batteries, gasoline engine and/or other types of power systems. As an example illustration, the robotic system 100 may include one or multiple batteries configured to provide charge to components that may receive charge via a wired and/or wireless connection.

Within examples, components of the mechanical components 114 and electrical components 116 may each connect to a different power source or may be powered by the same power source. Components of the robotic system 100 may connect to multiple power sources 112 as well. Further, the power source(s) 112 may charge using various types of charging, such as wired connections to an outside power source, wireless charging, combustion, or other examples. Other configurations may also be possible.

Mechanical components 114 represent possible hardware of the robotic system 100 that may enable operations by the robotic system 100. Among possible examples, the robotic system 100 may include actuator(s), extendable leg(s) ("legs"), arm(s), wheel(s), one or multiple structured bodies for housing the computing system or other components, and/or other mechanical components. The mechanical components 114 may relate to the design of the robotic system 100 and possible tasks that the robotic system 100 may be configured to perform.

In some examples, the robotic system 100 may be configured to add and/or remove mechanical components 114, which may involve assistance from a user and/or other robotic device. For example, the robotic system 100 may be initially configured with four legs, but may altered by a user or the robotic system 100 to remove two of the four legs to operate as a biped. Other examples of mechanical components 114 may be included within some implementations.

The electrical components 116 may be capable of processing, transferring, providing electrical charge or electric signals, for example. Among possible examples, the electrical components 116 may include electrical wires, circuitry, and/or wireless communication transmitters and receiver to enable operations of the robotic system 100. Additionally, the electrical components 116 may interwork with the mechanical components 114 to enable the robotic system 100 to perform various functions. The electrical components 116 may be configured to provide power and/or receive from the power source(s) 112 to the various mechanical components 114, for example. Further, the computing system 100 may include electric motors. Other examples of electrical components 116 may exist as well.

Figure 2:
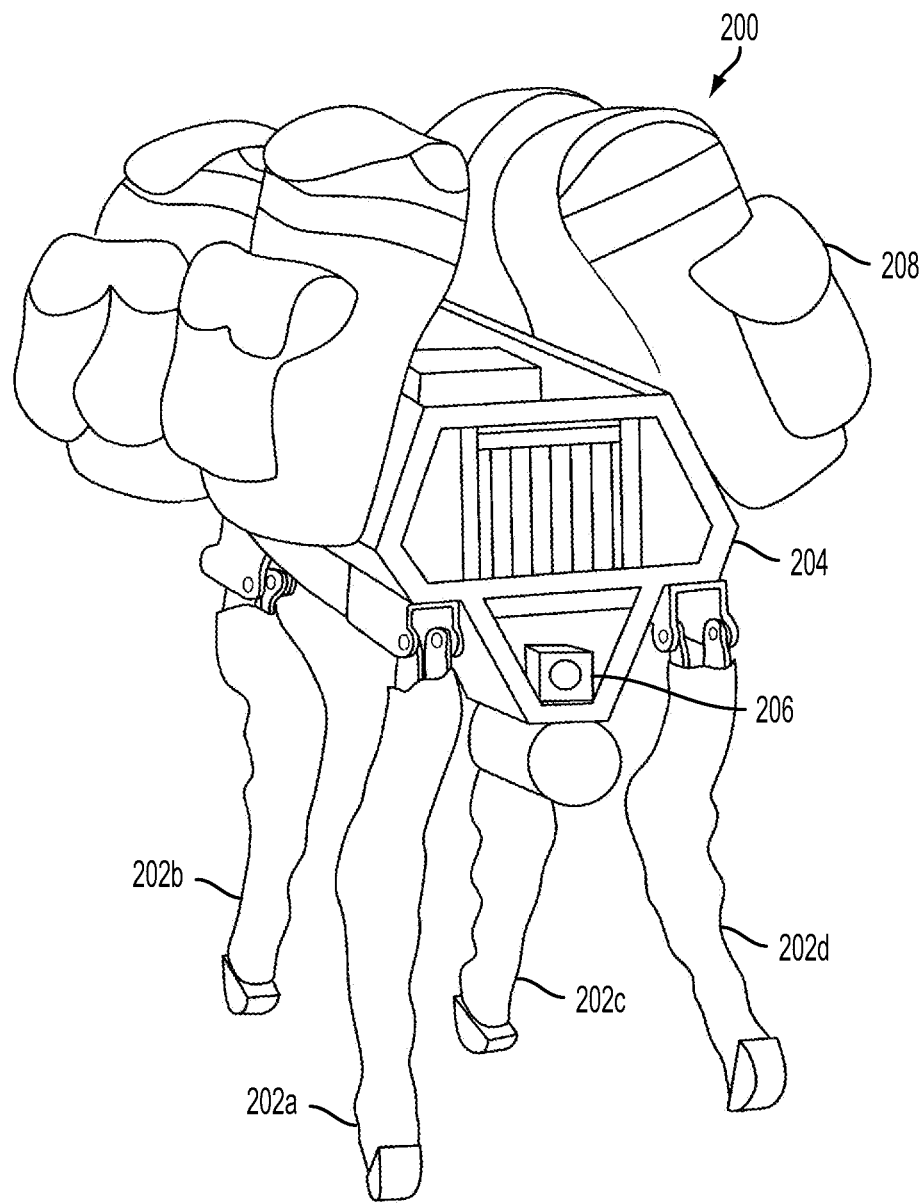
FIG. 2 illustrates a quadruped robot, according to an example implementation.

FIG. 2 illustrates a quadruped robot, according to an example implementation. The robotic device 200 may be a physical representation of the robotic system 100 shown in FIG. 1 or may be based on other robotic systems. Among other possible operations, the robotic device 200 may be configured to perform the methods and operations described herein during operation.

As shown in FIG. 2, the robotic device 200 includes legs 202a, 202b, 202c, 202d connected to a body 204 of the robotic device 200 and may also include sensors (e.g., sensor 206) configured to provide sensor data to a computing system of the robotic device 200. Further, the robotic device 200 is illustrated carrying objects 208 on the body 204, but may not carry objects within some example implementations. Further, in some implementations, the robotic device 200 may include more or less components and may additionally include components not shown in FIG. 2.

Although not shown in FIG. 2, the robotic device 200 may include a computing system that may be include one or multiple computing devices having processors configured to assist in various operations of the robotic device 200. The computing system may perform various operations, such as data processing and determining outputs based on the data. The computing system may process information provided by various systems of the robotic device 200 (e.g., sensor system) or from other sources (e.g., a user, another robotic device, a server) and may provide instructions to the systems to operate in response. For example, the computing system may monitor systems of the robotic device 200 during operation, which may be to watch for errors and/or monitor regular operation, for example.

In some example configurations, the computing system may serve as a connection between the various systems of the robotic device 200 that coordinates the operations of the systems together to enable the robotic device 200 to perform functions. Further, although the operations and methods described herein correspond to a computing system of a robotic device performing tasks, the computing system may be made of multiple devices, processors, controllers, and/or other entities configured to assist in the operation of the robotic device. Additionally, the computing system may operate using various types of memory and/or other components.

The robotic device 200 exists as a quadruped robotic device with four extendable legs 202a-202d also described herein as extendable legs. Although the robotic device 200 includes four legs 202a-202d in the illustration shown in FIG. 2, the robotic device 200 may include more or less legs within other examples. Further, the configuration, position, and/or structure of the legs 202a-202d may vary in example implementations.

The legs 202a-202d enable the robotic device 200 to travel and may be configured to operate in multiple degrees of freedom to enable different techniques of travel to be performed. In particular, the legs 202a-202d may enable the robotic device 200 to travel at various speeds through executing mechanics according to a gait. A gait may be a pattern of movement of the limbs of animal, robotic device, or other mechanical structure.

During operation, the robotic device 200 may use a variety gaits to travel within an environment, which may involve selecting a gait based on speed, terrain, the need to maneuver, and/or energy efficiency. Further, the robotic device 200 may be configured to switch between performing gaits, which may enable the robotic device to change speeds or the mechanics of operating the legs 202a-202d. Further, some types of robotic devices may use different gaits due to differences in design that may prevent the use of certain gaits.

Although some gaits may have specific names (e.g., gallop, bound), the distinctions between gaits may overlap with some gaits having slight variations. The gaits may be classified based on footfall patterns, also known as the locations on the surface for the placement of distal ends of the extendable legs (e.g., feet). Similarly, gaits may also be classified based on mechanics. One or multiple systems of the robotic device 200, such as a control system, may be configured to operate the legs 202a-202d to cause the robotic device to move. Additionally, the robotic device 200 may include other mechanical apertures, which may be attached to the robotic device 200 at various positions. The robotic device 200 may include mechanical arms, grippers, wheels, or other features. The legs 202a-202d may have feet or other type of mechanical features that enables control upon various types of surfaces that the robotic device may encounter, such as wheels, etc.

As part of the design of the example robotic device 200, the body 204 of the robotic device 200 connects to the legs 202a-202d and may house various components of the robotic device 200. As such, the structure of the body 204 may vary within examples and may further depend on particular functions that a given robotic device may have been designed to perform. For example, a robotic device developed to carry heavy loads may have a wide body that enables placement of the load. Similarly, a robotic device designed to reach high speeds may have a narrow, small body that does not have substantial weight. Further, the body 204 as well as the legs 202 may be developed using various types of materials, such as various metals or plastics. Within other examples, a robotic device may have a body with a different structure or made of other types of materials.

The sensor(s) 206 of the robotic device 200 may include various types of sensors, such as the camera or sensing system shown in FIG. 2. The sensor(s) 206 is positioned on the front of the body 204, but may be placed at other positions of the robotic device as well. As described for the robotic system 100, the robotic device 200 may include a sensory system that includes RADAR, LIDAR, GPS, accelerometer(s), gyroscope(s), and/or other types of sensors. The sensor(s) 206 may be configured to measure parameters of the environment of the robotic device 200 as well as monitor internal operations of systems of the robotic device 200. As one example illustration, the robotic device 200 may include sensors that monitor the accuracy of its systems to enable the computing system to detect any system within the robotic device 100 that may be operating incorrectly. Other uses of the sensor(s) 206 may be included within examples.

The objects 208 carried by the robotic device 200 may represent various types of cargo that the robotic device 200 may transport. The objects 208 may represent external batteries or other types of power sources (e.g., solar panels) that the robotic device 200 may utilize. The objects 208 represent one example use the robotic device 200 may be configured for. As such, the robotic device 200 may be configured to perform other functions and/or operations as well.

Additionally, as shown with the robotic system 100, the robotic device 200 may also include various electrical components that may enable operation and communication between the mechanical features of the robotic device 200. As previously indicated, the robotic device 200 may include one or multiple computing systems that include one or multiple processors configured to perform various functions, including processing inputs to provide outputs. The computing system may include additional components, such as various types of storage and a power source, etc.

In some example implementations, during operation, the computing system may communicate with other systems of the robotic device 200 via wired or wireless connections and may further be configured to communicate with one or multiple users of the robotic device. As one possible illustration, the computing system may receive an input from a user indicating that the user wants the robotic device to perform a particular gait in a given direction. The computing system may process the input and may perform a process that may cause the systems of the robotic device to perform the requested gait. Additionally, the robotic device's electrical components may include other type of electrical components, including but not limited to interface, wires, busses, and/or other communication links configured to enable systems of the robotic device to communicate.

Furthermore, the robotic device 200 may communicate with one or multiple users and/or other robotic devices via various types of interface. In one example implementation, the robotic device 200 may receive input from a user via a joystick or similar type of interface. The computing system may be configured to measure the amount of force and other possible information from inputs received from a joystick interface. Similarly, the robotic device 200 may receive inputs and communicate with a user via other types of interface, such as a mobile device or a microphone. The computing system of the robotic device 200 may be configured to process the various types of inputs that the robotic device 200 may receive.

Figure 3:
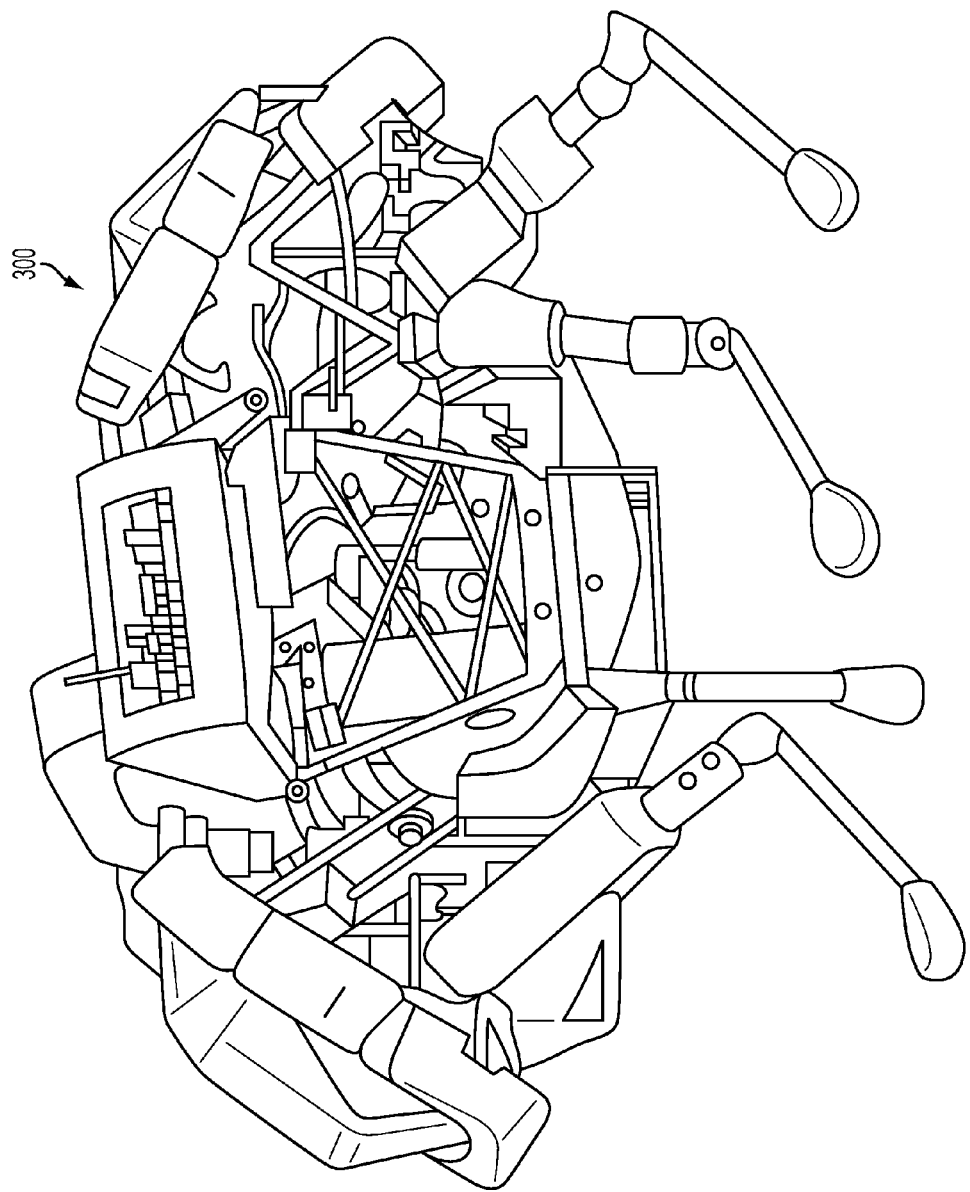
FIG. 3 illustrates another quadruped robot, according to an example implementation.

FIG. 3 illustrates another example quadruped robot, according to an example implementation. Similar to robotic device 200 shown in FIG. 2, the robotic device 300 may correspond to the robotic system 100 shown in FIG. 1. The robotic device 300 serves as another possible implementation of a robotic device that may be configured to perform bound and/or gallop gaits. Other example implementations of robotic devices may exist.

Figure 4:
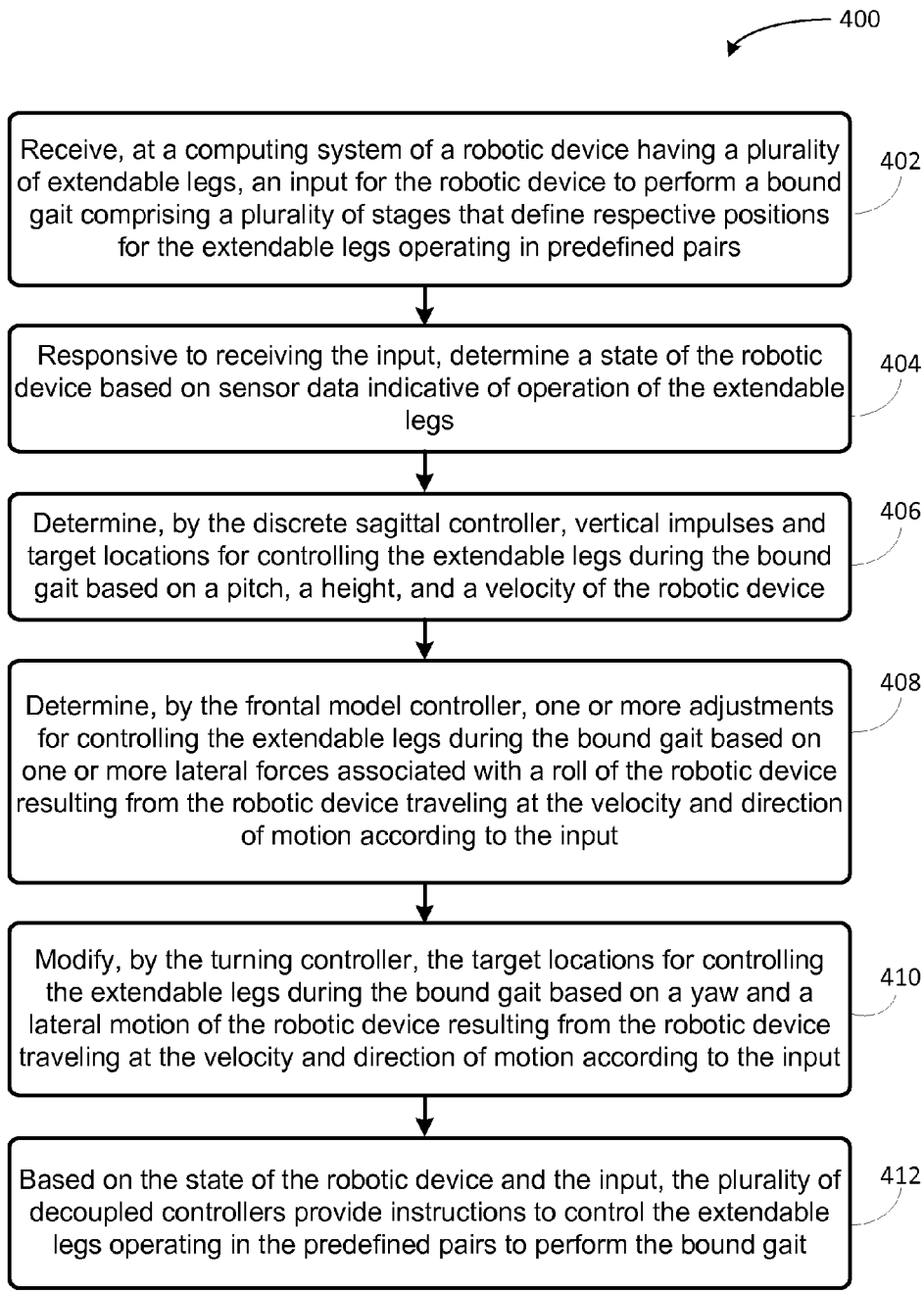
FIG. 4 is a flowchart for a bound gait, according to an example implementation.

FIG. 4 is an example flowchart for performing a bound gait, according to an example implementation. The method 400 may include one or more operations, functions, or actions as illustrated by one or more blocks 402-412. Although the blocks are illustrated in a sequential order, these blocks may, in some instances, be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

The non-transitory computer readable medium could also be distributed among multiple data storage elements, which could be remotely located from each other. A computing device or system that executes some or all of the stored instructions could be any type of robotic device, such as the example robotic device 200 or robotic device 300 illustrated in FIGS. 2-3. Alternatively, the computing device or system that executes some or all of the stored instructions could be another computing device or system, such as a server.

In addition, for the method 400 and other processes and methods disclosed herein, each block in FIG. 4 may represent circuitry that is wired to perform the specific logical functions in the process. Example methods, such as method 400 of FIG. 4 may be carried out in whole or in part by the robotic device and its subsystems. Accordingly, example methods could be described by way of example herein as being implemented by the robotic device. The robotic device may be autonomous, partially autonomous, or controlled completely by a user, for example. However, it should be understood that an example method may be implemented in whole or in part by other computing devices of the robotic device or separate from the robotic device. For example, an example method may be implemented in whole or in part by a server system, which receives data from a device such as those associated with the robotic device.

At block 402, the method 400 may include receiving, at a computing system of a robotic device having a plurality of extendable legs, an input for the robotic device to perform a bound gait comprising a plurality of stages that define respective positions for the extendable legs operating in predefined pairs.

Example robotic devices configured to perform the method 400 may include a computing system (e.g., control system) as shown by the example robotic devices shown in FIGS. 2-3. As indicated in FIG. 1, the computing system may include various controllers, which may be configured to operate in a decoupled configuration within some implementations. Among possible other controllers, the robotic device may include a discrete sagittal controller(s), a frontal model controller(s), a lateral controller(s), and/or a turning controller(s). Further, some controllers of the robotic device may be discrete-time controllers generated from offline modeling. The discrete-time control inputs may correspond to foot touchdown locations and impulses allied over stance and may be computed at the beginning of each stance phase. The offline modeling may vary within examples, which may include configuring the different controllers based on independent and/or dependent time configurations.

As indicated, a robotic device may include one or more discrete controllers configured to assist in controlling movements of the robotic device. In some examples, one or more discrete controllers of a given robotic device may be developed using offline modeling derived from the dynamics associated a gait, such as bound or gallop gaits. For offline modelling, a simplified model of the robot may be used to simulate one full gait cycle. For example, the simplified model of the robot may perform a full cycle of a bound gait or gallop gait. As such, the full gait cycle may exist as recurrent with different states. The velocity, angular velocity, and orientation of the legs of the robotic device may exist in similar or the same positions as the legs of the robotic device the end of the simulation. That way, the robotic device performing a gait may operate in a continuous loop. In some implementations, the desired states used and implemented by the discrete time controller(s) at each gait stage transition may be based on this recurrent simulation.

In addition, state space models for each stage of a respective gait cycle may be created by varying states and inputs in the simulation and linearizing the results dynamics at each stage of a gait. In some implementations, the controller gains used for each gait stages may be computed offline from state space models and linear-quadratic regulator (LQR).

As indicated, the computing system or other component of the robotic device may receive an input to perform a bound gait. The computing system of an example robotic device performing the method 400 may receive inputs from various sources. For example, the computing system may receive inputs from systems of the robotic device, such as a control system, sensor system, and/or navigation system. As an example illustration, the computing system may receive an input for the robotic device to perform the bound gait from the navigation system as a result of determining changes in the environment or to increase speed, among other reasons. Another possible source of the inputs may be interface that enables a user to provide inputs to the robotic device. The computing system may receive inputs from a user that is using a controller, mobile device, and/or another type of interface enabling a user to guide operations of the robotic device.

In some instances, the input may indicate that the robotic device should perform the bound gait. The input may directly specify that a user controlling the robotic device wants the robotic device to perform the bound gait. In other instances, the input may provide information that enables the computing system to determine that the robotic device should execute the bound gait. For example, the input may specify a speed and/or direction of motion for the robotic device to travel. Upon receiving the input, the computing system may process the information within the input to determine that performing a bound gait may be a good response to the input. The bound gait may operate within a range of speed or have certain mechanics that make performing the bound gait the response the computing system determines based on an input.

As indicated, the input may provide parameters for executing the bound gait, such as a velocity and/or a direction of motion for the robotic device to travel. In another example implementation, the input may specify particular mechanics for the robotic device to execute the bound gait using. For example, the input may specify flight time and leg phasing to use during the performance of the bound gait by the robotic device. The computing system of the robotic device as well as other components (e.g., controllers) may use the information within the input to guide controls for performing the bound gait.

At block 404, the method 400 may include, responsive to receiving the input, determining a state of the robotic device based on sensor data indicative of operation of the extendable legs. As shown in FIGS. 1-3, an example robotic device may include a sensor system configured to capture sensor data (e.g., measurements) corresponding to the environment and/or systems of the robotic device. The computing system may use sensor data corresponding to systems of the robotic device and/or other possible sensor data to determine a state of the robotic device. In some instances, the state of the robotic device may indicate the current operation of the legs and/or other components of the robotic device. The state of the robotic device may also specify the power level, current stability, and/or momentum of the robotic device. Additionally, the state of the robotic device may represent a current point of operation(s) of the robotic device, such as the current state of operation of a current gait by the robotic device.

Furthermore, the computing system may determine the state of the robotic device based on the roll, yaw, and/or lateral motion of the robotic device. In some implementations, the roll may represent rotation about an axis running from the front of the robotic device to the back of the robotic device. Similarly, in some implementations, the yaw may represent changes in the orientation or direction that the robotic device may be traveling towards and the lateral motion may represent side motion of the robotic device. Additionally, the state of the robotic device may also be indicative of a pitch of the robotic device, which may represent the orientation of the robotic device according to a side axis. Other orientation and/or position information of the robotic device may correspond to the roll, yaw, and/or lateral motion used by the computing system to determine a state of the robotic device.

In another example implementation, the computing system may factor the momentum of the robotic device for determining the state of the robotic device. For example, the computing system may use a momentum-resolved inverse kinematics solver to determine a velocity, momentum, and/or other information relating to the operation of the robotic device for determining the state of the robotic device. The computing system may utilize the momentum of the robotic device for other operations as well.

Furthermore, the computing system of the robotic device may be configured to determine a posture of the robotic device when determining the state of the robotic device. The computing system may determine an orientation of the robotic device as well as components of the robotic device, which the computing system may use to compare to a natural posture that may be programmed into data available to the computing system. The computing system may determine differences between current orientation of the robotic device relative to a target natural posture for information to use associated with the state of the robotic device. Different robotic devices may have varying natural postures for orientation and positioning of components during different operations.

At block 406, the method 400 may also include determining, by the discrete sagittal controller, vertical impulses and target locations for controlling the extendable legs during the bound gait based on a pitch, a height, and a velocity of the robotic device. The target locations may correspond to locations on a surface of the environment the landing the extendable legs.

As shown in the robotic system 100 illustrated in FIG. 1, an example robotic device may include controllers configured to perform operations relating to the control of the robotic device. Among possible controllers, the robotic device may include a sagittal controller, which may be configured as a sagittal controller. The sagittal controller may be configured to operate in a decoupled configuration relative to other controllers. Further, the sagittal controller may communicate with the computing system and/or other systems of the robotic device (e.g., control system or navigation system). The sagittal controller may operate as a discrete sagittal controller in some implementations.

The sagittal controller may operate based on discrete state-space model with multiple stages (e.g., four stages). According to measurements relating to one or more of the pitch, the height, and the velocity of the robotic device, the sagittal controller may determine forward step outs for extending set(s) of predefined legs of the robotic device. In addition, the sagittal controller may also use the measurements to determine vertical impulses for raising the legs of the robotic device for executing the bound gait.

Furthermore, one or more discrete sagittal controllers may use sensed gains to determine state error at the beginning of each stance period of a gait, for example. A sagittal controller may also use determined gains to enable variations (e.g., adjustments to operations of legs) during operation.

In some examples, the sagittal controller may include a set of individual state-space controllers. Each individual controller may be associated with one stage of the gait cycle. The state-space controllers may be configured based on linearized offline models of dynamics of a robotic device, and may also include a set of desired robot states and a set of gains, for example. The different states of the sagittal controller may include the pitch, pitch rate, and/or angular velocity about the rotational axis, height, vertical velocity, and/or forward velocity of the robotic device.

In some examples, when a robotic device transitions to a new stage in a given gait cycle (e.g., changing between extended flight to a front stance by setting the front legs on the ground), the different between the current state and desired state for the newly entered stage may be calculated. The state error may then be multiplied by the gains of the controller to determine adjustments to apply to the impulses and/or target positions of the feet of the robotic device. One or more adjustments to impulses can be applied to the legs currently in stance and target position adjustments may be applied to the next set of legs of the robotic device that touches the ground during travel.

At block 408, the method 400 may include determining, by the frontal model controller, one or more adjustments for controlling the extendable legs during the bound gait based on one or more lateral forces associated with a roll of the robotic device resulting from the robotic device traveling at the velocity and direction of motion according to the input. The frontal model controller may assist in controlling the travel of the robotic device by supplementing the operation of the legs with adjustments that enable stability by the robotic device. The adjustments provided by the frontal model may enable the robotic device to maintain a natural posture that is associated with performing the bound gait.

In some example implementations, the frontal model controller may control roll dynamics by adjusting forces in a z-axis direction determined by a sagittal state-space model.

Similarly, the frontal model controller may use simple two-dimensional (2D) force allocation to determine y-axis direction forces.

As indicated, a robotic device may include one or more frontal controllers. A frontal controller may operate when the robotic device is performing a gait, such as the bound gait. As such, a frontal controller may be a simple controller configured to continuously adjust lateral forces applied to the legs and the feet of the robotic device in order to control roll dynamics of the robotic device. In some examples, the frontal controller may determine the errors between the current and desired roll as well as roll rates of the robotic device. In addition, the frontal controller may further use the errors and gains detect to determine a moment to be applied about the roll axis to correct the error.

The frontal controller or other controllers may manipulate the leg pairs of robotic devices to move with lateral forces to achieve the roll moment. Due to the redundancy with legs applying forces, a simple force allocation scheme may be used by the frontal controller to divide the desired lateral forces between the stance legs such that the hip torques may be minimized.

At block 410, the method 400 may include modifying, by the turning controller, the target locations for controlling the extendable legs during the bound gait based on a yaw and a lateral motion of the robotic device resulting from the robotic device traveling at the velocity and direction of motion according to the input. In some example implementations, the turning controller may be configured to control yaw and lateral velocity of the robotic device by changing the foot touchdown locations of the robotic device legs as determined by the sagittal controller.

Further, the turning controller may operate without connection and/or communication with the sagittal controller. A computing system may combine the instructions provided by both controllers prior to controlling the legs of the robotic device to perform the bound gait.

In some example implementations, the turning controller may receive information relating to the target touchdown locations determined by the sagittal controller. Upon receiving the information, the turning controller may determine adjustments for the foot touchdown locations for placing the legs during performing the bound gait. The turning controller may factor the desired trajectory when determining changes for the foot touchdown locations.

At block 412, the method 400 may further include, based on the state of the robotic device and the input, the plurality of decoupled controllers providing instructions to control the extendable legs operating in the predefined pairs to perform the bound gait. The instructions may indicate mechanics and/or operation parameters for systems of the robotic device to execute the bound gait. The decoupled controllers may provide instructions to the computing system, among other possible systems. The instructions may indicate the parameters for performing the bound gait, including a speed of operation as well as a possible direction. The controllers and/or the computing system may provide the instructions to the systems of the robotic device to perform the bound gait.

In some example implementations, the instructions for performing the bound gait may include instructions for adding flight time between phases of the bound gait. The instructions may provide an added flight time, no leg phasing, and/or other parameters for executing the bound gait. Further, in some implementations, the decoupled controllers may communicate with a computing system and/or a control system of the robotic device configured to control the legs and possibly other components to perform the bound gait.

Figure 5:
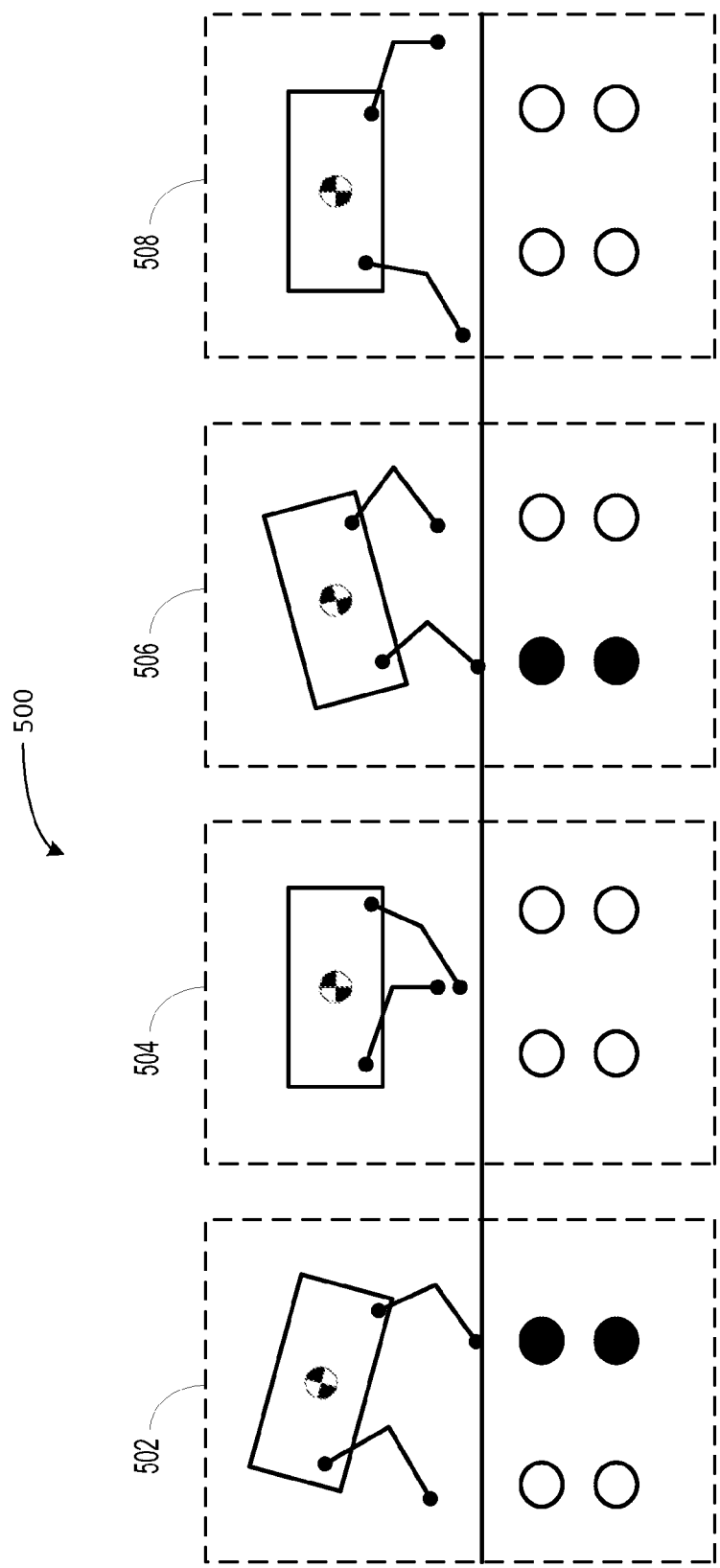
FIG. 5 shows a diagram illustrating example gait stages for performing a bound gait

FIG. 5 shows a diagram illustrating the various gait stages of performing a bound gait. As shown in the diagram 500, a robotic device performing the bound gait may operate its legs and possibly other mechanical features in a way that the legs cycle between various bound gait stages, such as a front pair stance 502, a gathered flight stage 504, a hind pair stance 506, and an extended flight stage 508.

Although the diagram 500 illustrates the bound gait having four bound gait stages, other diagrams and/or illustrations may show the bound gait as having more or less gait stages. In some examples, the bound gait may be divided into bound gait stages other than the bound gait stages shown in FIG. 5. The diagram 500 serves for illustration purposes and a robotic performing a bound gait may execute more or less of the positions shown when performing a bound gait within other examples.

Furthermore, structurally-varying robotic devices may perform the bound gait differently, which may involve a robotic device extending legs farther or short as one example of a possible difference. The timing of the performance of the bound gait may vary within examples in some implementations. Other differences in performing the bound gait may exist as well.

As previously indicated, a robotic device, such as the example robotic devices shown in FIGS. 2-3, may be configured to perform a bound gait to move throughout an environment. Performing the bound gait may enable the robotic device to traverse an environment quickly at desired speeds and may be desired by a user and/or robotic device based on the environment or other factors.

As the diagram 500 shows, a quadruped robotic device may perform the bound gait by operating its legs as predefined pairs (e.g., contralateral pairs). Upon receiving a request and/or other type of indication for the robotic device to perform a bound gait, the robotic device's computing system may process the input and provide instructions to controllers to control legs as pairs that enable the robotic device to perform the bound stages of the bound gait. In particular, extendable legs operating within a leg pair may move with matching motion in such a manner that the leg pair appears to operate as a single leg.

For the respective stages of the bound gait, an example stage is illustrated within a box. The box also contains circles representing the feet of the robotic device with the placement of the circles corresponding to the placement of the legs on the robotic device. The shaded in circles correspond to the feet of the legs of the robotic device touching the surface during the bound gait and the empty circles correspond to the feet of those legs of the robotic device not touching the surface. Other examples may exist as well.

The front pair stance 502 shown in diagram 500 displays the robotic device with the front leg pair positioned on the surface and its back pair of legs elevated off the ground. The robotic device may propel forward as the controllers position the front pair of legs on the ground and reposition the legs to push off the ground to reach another stage of the bound gait, such as the gathered flight stage 504.

The gathered flight stage 504 of the bound gait may serve as an intermediate step while performing the bound gait in some implementations. The gathered flight stage 504 may involve the control system of the robotic device positioning both sets of legs under the robotic device and off the ground as the robotic device moves forward in the air. In some implementations, the gathered flight stage 504 may exist during an extended duration of the bound gait since the legs of the robotic device may be on the surface less due to an increase in acceleration and/or a high velocity.

The hind pair stance 506 is similar to the front pair stance 502, but involves the hind pair of the robotic legs positioned on the ground. The robotic device may cycle into the hind pair stance 506 from the gathered flight 504 and/or the extended flight stage 508 landing the hind set of robotic legs on the ground and pushing off to generate power propelling the robotic device forward according to a desired velocity and in a desired direction of motion.

The extended flight stage 508 of the bound gait involves the computing system extending the front predefined pair of legs forward and off the surface and the back predefined pair of legs back off the surface and away from the center of the robotic device. The robotic device may enter into the extended flight stage 508 from a hind pair stance 506, which may involve the hind pair stance 506 propelling the robotic device forward and off the ground by the hind pair of legs pushing off the surface of the environment. The extend flight stage 508 involves the robotic device extending forward in the air without any legs touching the ground until the front pair of legs land on the surface in the front pair stance 502 to start repeating the cycle of recurring gait stages associated with the bound gait.

Although the diagram 500 shows the bound gait having multiple stages, a robotic device performing the bound gait may change switch between the different stages continuously as the robotic device performs the bound gait. The controllers may control the different pairs of legs to operate in a loop changing between the various stages of the bound gate causing the robotic device to move at a desired velocity through the environment.

Figure 6:
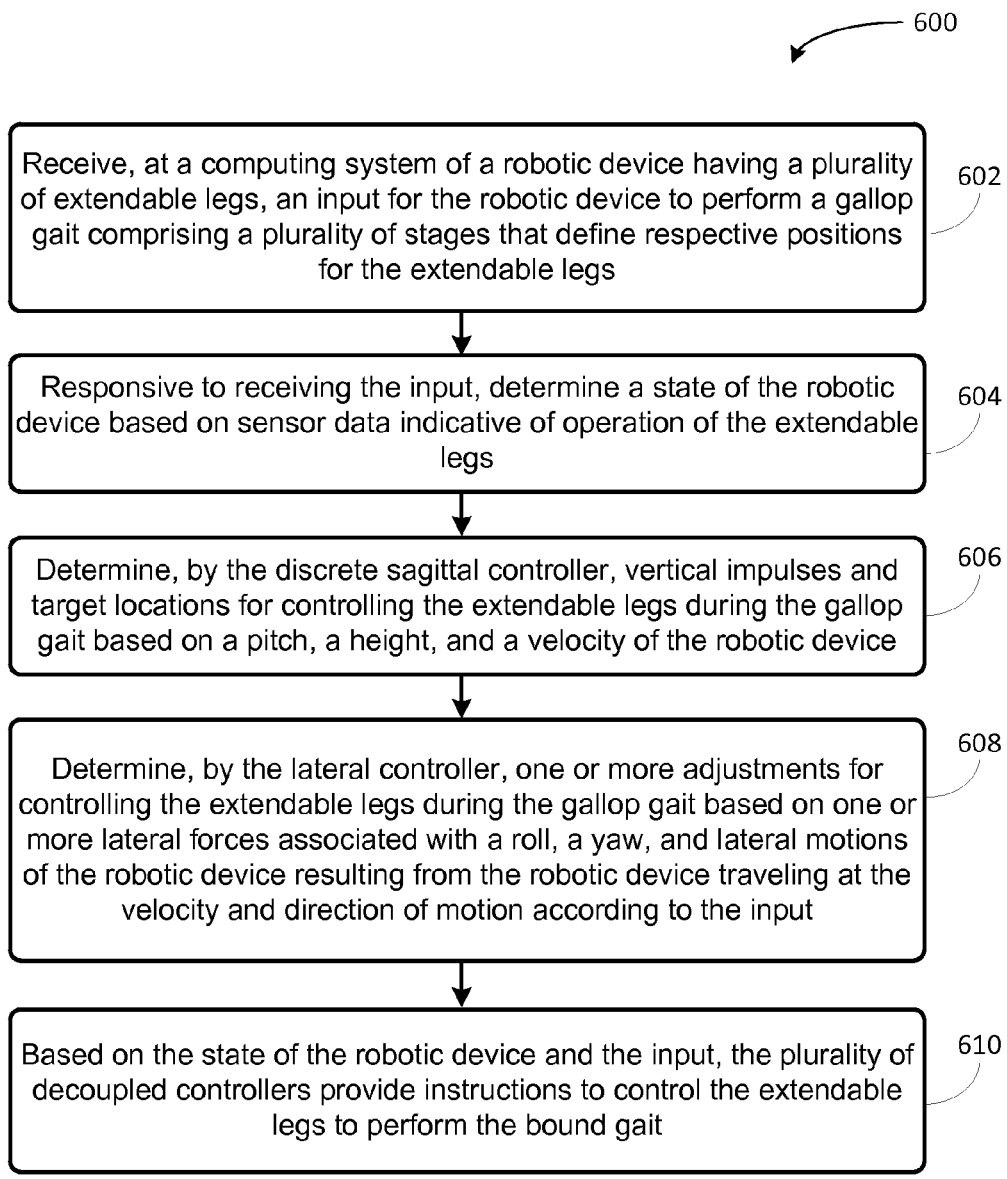
FIG. 6 is a flowchart for a gallop gait, according to an example implementation.

FIG. 6 is a flowchart for performing a bound gait, according to an example implementation. Similar to the method 400, the method 600 may include one or more operations, functions, or actions as illustrated by one or more blocks 602-610. Although the blocks are illustrated in a sequential order, these blocks may, in some instances, be performed in parallel, and/or in a different order than those described herein. Also, the various blocks may be combined into fewer blocks, divided into additional blocks, and/or removed based upon the desired implementation.

At block 602, the method 600 may include receiving, at a computing system of a robotic device having a plurality of extendable legs, an input for the robotic device to perform a gallop gait comprising a plurality of recurring gait stages that define respective positions for the extendable legs. Similar to block 402 of method 400, the computing system of an example robotic device may receive input(s) requesting the performance of a gallop gait.

In some example implementations, a robotic device may be configured to perform both the gallop and/or bound gait. For example, a quadruped robotic device, such as the robotic devices shown in FIGS. 2-3, may be configured to perform the different gaits. In some instances, a robotic device may include be configured to perform the bound gait or the gallop gait, but not both. The design and configuration of robotic devices may vary and may enable the robotic devices to execute the gaits. For illustration purposes, the robotic device performing the method 600 for performing the gallop gait may also perform the method 400 for executing the bound gait.

As previously indicated, the robotic device that utilizes a gallop gait may include a computing system, which may include various controllers as previously described in FIG. 4. As such, the computing system may receive inputs, which may signal for execution of a gallop gait by the robotic device. The input may specify the gallop gait and/or parameters that the computing system may determine that parameters of gallop gait may satisfy. The computing system may determine that executing a gallop gait may provide stability or accomplish parameters set forth in an input, such as desired speeds, and/or direction of motion. Furthermore, similar to the bound gait, the computing system may receive the inputs from various sources, such as systems of the robotic device and/or via interface enabling user input.

In addition, the input may provide parameters for performing the gallop gait, which may include a velocity and a direction of motion for the robotic device to travel. Similar to other types of input, such as inputs described for the bound gait, the inputs signaling for the gallop gait may specify parameters for the robotic device and systems of the robotic device to use when enabling the robotic device to perform the gallop gait.

At block 604, the method 600 may include, responsive to receiving the input, determining a state of the robotic device based on sensor data indicative of operation of the extendable legs. Similar to determining the state of the robotic device described in method 400 for performing the bound gait, the computing system may also determine the state of the robotic device upon receiving an input requesting the performance of a gallop gait by the robotic device. Additionally, in some instances, the computing system may enable the performance of the gallop gait without determining the state of the robotic device.

In some example implementations, the computing system may determine a momentum and/or velocity associated with the robotic device for determining the state of the robotic device. The computing system may analyze the power level of the robotic device, stability, and/or other information associate with components for determining the state of the robotic device. In an example illustration, the computing system may factor the momentum, acceleration, velocity, among other information for determining the state of the robotic device. Other example implementations may exist.

At block 606, the method 600 may include, determining, by the discrete sagittal controller, vertical impulses for controlling the extendable legs during the gallop gait based on a pitch, a height, and a velocity of the robotic device. The target locations may correspond to locations for landing the legs on a surface in the environment.

In some example implementations, the sagittal controller may be configured to assist in the performance of both the gallop gait and the bound gait. The sagittal controller may be configured to determine forward steps and/or vertical impulses for controlling the legs of the robotic device during the gallop gait in a similar manner as during the bound gait. Unlike the bound gait, the sagittal controller may assist controlling the legs of the robotic device so that only a single leg touches the surface at any time throughout the performance of the gallop gait.

The discrete sagittal controller used during a gallop gait may mirror the discrete sagittal controller used n the bound gait in some examples. In some instances, a single discrete sagittal controller may be used for both gaits. In addition, different states of a controller assisting the performance of a gallop gaits may include pitch, angular rate about the lateral axis, height, and vertical velocity. Errors between measured and desired states may be multiplied by controller gains at each gait stage transition to determine adjustments to the impulses and target positions of the legs. One or more controllers may perform measurements or control legs of the robotic device according to the determined adjustments.

At block 608, the method 600 may include determining, by the lateral controller, one or more adjustments for controlling the extendable legs during the gallop gait based on one or more lateral forces associated with a roll, a yaw, and lateral motions of the robotic device that may result from the robotic device traveling at the velocity and direction according to the input.

The lateral controller may be configured to assist the robotic device maintain desired heading and execute sidesteps until a lateral velocity has been arrested during the gallop gait. In some implementations, the lateral controller may set the yaw rate of the robotic device's reference frame.

In some instances, the lateral controller may receive lateral inputs, such as impulses in the x-axis and the y-axis. Further, the lateral controller may receive offset information corresponding to the robotic device. The lateral controller may adjust heading of the robotic device, which may include maintaining a desired heading through the use of sidesteps, for example. The lateral controller may further determine adjustments for controlling the legs of the robotic device by aligning the robotic device with the velocity vector so that lateral motions contribute to the forward direction.

In an example implementation, the lateral controller may determine adjustments in the yaw the robotic device to align with the velocity vector in response to detecting lateral disturbances. In some instances, the lateral controller may only determine adjustments in response to large lateral disturbance(s). The lateral controller may improve the stability of the robotic device through determining adjustments for controlling the legs based on lateral disturbances, for example.

At block 610, the method 600 may further include, based on the state of the robotic device and the input, the plurality of decoupled controllers providing instructions to control the extendable legs to perform the gallop gait. The instructions may indicate mechanics and/or operation parameters for systems of the robotic device to execute the gallop gait. The decoupled controllers may provide instructions to the computing system, among other possible systems. The instructions may indicate the parameters for performing the bound gait, including a speed of operation as well as a possible direction. The controllers and/or the computing system may provide the instructions to the systems of the robotic device to perform the gallop gait.

In some example implementations, the instructions for performing the gallop gait may include instructions for adding flight time between phases of the bound gait. The instructions may provide an added flight time, no leg phasing, and/or other parameters for executing the gallop gait. The instructions may include parameters for performing the gallop gait with flight time and leg phasing.

In another example implementation, the robotic device may include multiple discrete-time controllers based on state-space plant models generated from offline modeling. For example, the robotic device may perform the gallop gait using two decoupled discrete controllers, such as a sagittal controller and a lateral controller. The control system of the robotic device may include a computing system and/or controllers configured to find a three-dimensional (3D) recurrent gallop. The control system may compute the sagittal model, which may involve use of the sagittal controller. Likewise, the control system may compute lateral model information, which may involve use of the lateral motion controller. The lateral controller may encompass roll, lateral, and/or yaw dynamics of the robotic device. Both the models may be derived from on 3D recurrent gait.

The gallop state space models may be developed in a similar manner as the bound discrete model previously described. An offline simulation of the simplified dynamics of one recurrent cycle of a gallop gait may be used to find the desired states at respective gait stage transition times. A state space model for each stage may be determined offline by computing the sensitivity of the gait dynamics to variations in states and controller actions at the stage. This may be accomplished by varying states and inputs in simulation and linearizing the resulting changes in the dynamics. Controller gains may then be computed offline from the state space models using LQR. Both the discrete sagittal and discrete lateral controllers used in a gallop gait may be derived from the same simulations of gait dynamics.

Figure 7:
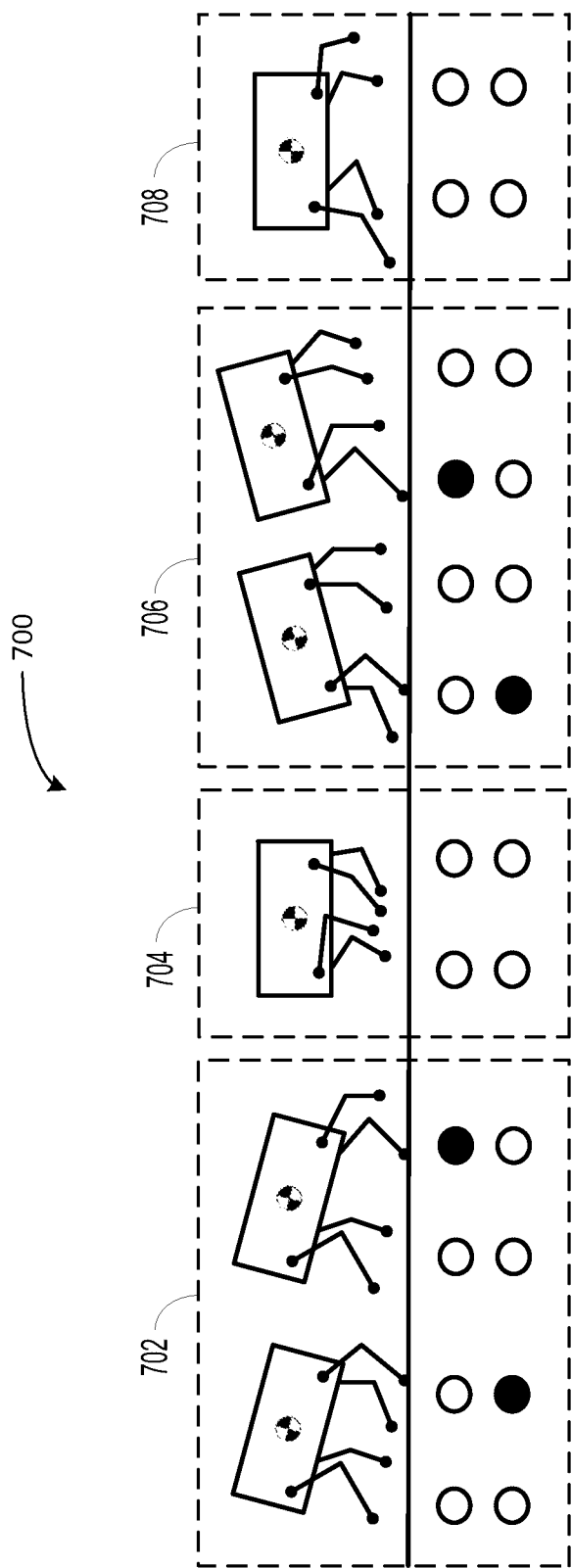
FIG. 7 shows a diagram illustrating example gait stages for performing a gallop gait.

FIG. 7 shows a diagram illustrating the various gallop gait stages of performing a gallop gait. As shown in the diagram 700, the bound gait includes different gallop gait stages, such as a front stance 702, a gathered flight stage 704, a hind stance 706, and an extended flight stage 708. Similar to the bound gait, the diagram 700 illustrates the different gait stages of the gallop gait. Other diagrams may illustrate the gallop gait using more or less gait stages. Additionally, within other diagrams, the gallop gait may be divided into gallop gait stages other than the gallop gait stages shown in FIG. 7. The diagram 700 serves for illustration purposes and a robotic performing a gallop gait may perform more or less actions when performing a gallop gait within other examples.

The various stages associated with performing the gallop gait are similar to the stages of the bound gait, but involve controlling the extendable legs freely and not in pairs. Furthermore, the gallop gait may involve the robotic device traveling with mechanical motions that place only a single foot of a leg on the surface in the environment at a given time. Thus, the mechanics involved in performing the gallop gait may include rotating the legs that touch the ground while the robotic device travels forward.

Similar to the bound gait, the respective stage of the gallop gait are illustrated within boxes. The boxes also contain circles representing the feet of the robotic device with the placement of the circles corresponding to the placement of the legs on the robotic device. The shaded in circles correspond to the feet of the legs of the robotic device touching the surface during the bound gait and the empty circles correspond to the feet of those legs of the robotic device not touching the surface. Other examples may exist as well.

The front stance 702 involves the control system placing one of the front legs of the robotic device on the surface while the other legs of the robotic device are positioned off the surface. The robotic device may generate power and velocity for traveling through alternating placing feet of different legs on the ground. The control system may place either the front left or front right leg on the ground for the front stance 702 in the case of a quadruped robotic device. Furthermore, the robotic device may enter the front stance 702 from the gathered flight stage 704 and/or the extended flight stage 708, which may involve landing one leg on the surface to provide stability and enable travel.

The gathered flight stage 704 involves a control system of the robotic device positioning the legs of the robotic device off the ground and towards a center of the robotic device. The gathered flight stage 704 is one of the states of the gallop stage that the robotic device does not have any feet touching the surface, but rather is propelling in a direction after pushing off the surface during the front stance 702 or the hind stance 706.

The hind stance 706 involves the control system placing one of the hind legs of the robotic device on the surface of the environment while the other legs are positioned off the surface. Similar to the front stance 702, the hind stance 706 involves one of the hind legs touching the surface rather than a front leg.

The extended flight stage 708 is similar to the gathered flight stage 704, but involves the legs of the robotic device being extended away from the center of the robotic device and off the surface by a control system. The extended flight stage 708 may vary in duration depending on the velocity and/or acceleration of the robotic device, for example.

During execution of the gallop gait, the control system of the robotic device may vary the amount of time that the legs of the robotic device are in any of the stages. In one example implementation, the robotic device may generate more power during the front stance 702 and the hind stance 706 to enable the robotic device to remain in the gathered flight stage 704 and the extended flight stage 708 longer, which may increase the speed or acceleration of the robotic device. Furthermore, the control system may operate the legs of the robotic device to cycle through the different stages of the gallop gait at various speeds and may adjust the speed of the cycle depending on the velocity desired for the gallop gait. Other examples may exist as well.

Figure 8:
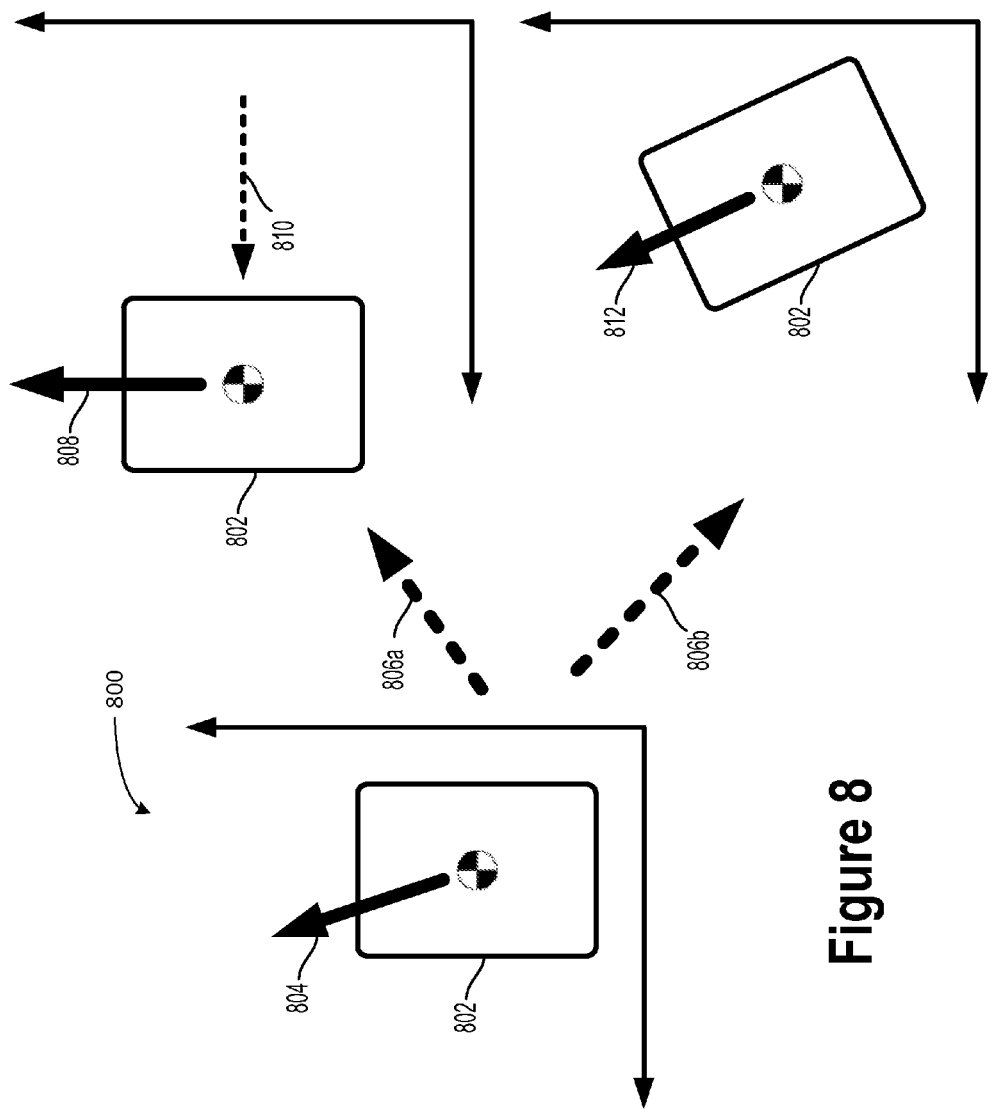
FIG. 8 shows an example diagram illustrating gallop heading control.

FIG. 8 shows diagram illustrating gallop heading control, according to example implementations. The example diagram 800 illustrates the robotic device 802 performing a gallop gait relative to an x and y axis included for illustration purposes. The robotic device 802 receives a lateral disturbance 804 as shown during performance of the gallop, which acts slightly against the forward direction of travel of the robotic device 802.

In some example implementations, the control system of the robotic device 802 may select a first mode (as shown by arrow 806a), which involves the robotic device 802 changing position by lateral motion 810 in order to adjust the heading of the robotic device to move in a forward velocity 808 as a result of the impact of the lateral disturbance 804.

In other example implementations, the control system may select another mode (as shown by arrow 806b), which involves adjusting the yaw and/or orientation of the robotic device relative to the environment so that the robotic device may travel in the direction of the lateral disturbance 804 as shown by the velocity vector 812 in FIG. 8. Adjusting the yaw may reduce the impact of the lateral disturbance 804 upon the robotic device 802. Furthermore, other responses by the control system to lateral disturbances on the robotic device may exist as well. Additionally, the robotic device 802 may perform similar operations when performing a bound gait within examples.

As indicated, a lateral controller and/or other type of controller may determine operations for controlling the yaw and/or orientation of the robotic device 802 during a gallop gait. As shown, in one option, the robotic device 802 may maintain a desired heading (e.g. forward velocity 808) and perform one or multiple sidesteps (e.g., lateral motion 810) until lateral velocity may have been arrested. The multiple sidesteps may changes the overall position of the robotic device 802 relative to the x and y axis shown for illustration purposes in FIG. 8.

As indicated above, for another option, the control system of the robotic device 802 may configure mechanical features (e.g., legs) of the robotic device to yaw the robot in a way that aligns with the velocity vector. This causes the velocity error to be now positioned in the forward direction. In some instances, a large lateral velocity disturbance may push state error into a direction that the robot may be better equipped to handle. Other examples may exist. In some instances, in other examples, a single controller may be configured to perform various operations described herein.

Figure 9:
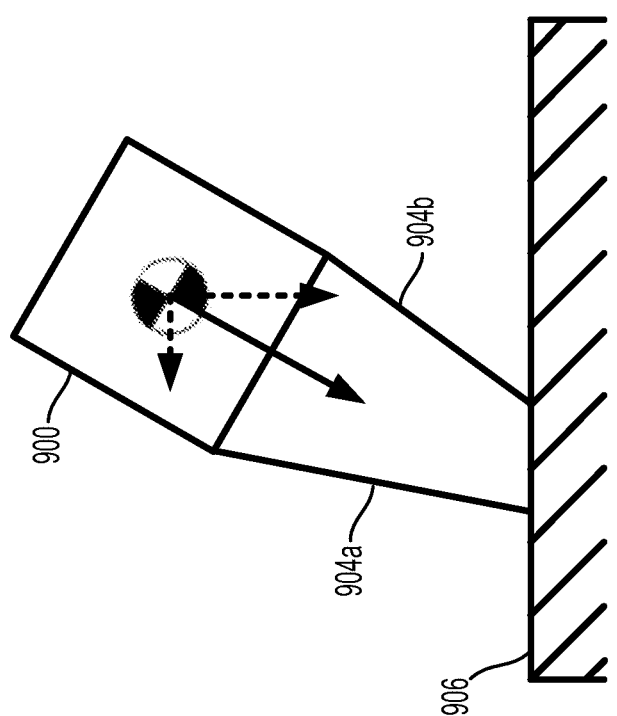
FIG. 9 shows a diagram illustrating bank turning, according to an example implementation.

FIG. 9 shows a diagram illustrating bank turning, according to an example implementation. During operation, a robotic device 900 executing a bound gait or gallop gait may be configured to perform banked turns to enable the robotic device to maintain momentum, stability, and handle execution of the turns more efficiently, among other benefits. In particular, the robotic device may executing banked turn operations during navigation by shifting the feet of legs 904a-904b laterally on the surface 906 and enabling the body of the robotic device 900 to roll into the turn. In some examples, the control system may shift one or multiple feet of the robotic device out from beneath the body on turns to shift the support envelope of the robotic device in response to centripetal acceleration.

In some example implementations, the turning controller of the robotic device 900 may assist in performing the banked turns by determining adjustments for target landing locations on surface 906 for the feet of the robotic device 900. The turning controller may utilize the roll, orientation, and/or other parameters associated with the robotic device during the turn to enable banked turning. During a turn, the control system may roll the body to align with the acceleration vector to keep hip workspace of the robotic device 900 balanced. As such, aligning the body with the acceleration vector may enable the robotic device 900 to continue traveling at a desired speed and/or direction that keeps the robotic device is a position that enables good stability.

Further, the amount of adjustments and aligning the body may depend on the degree of turn as well as the speed and/or acceleration of the robotic device executing the turn. Additionally, different types of gaits may involve unequal amounts of adjustment of target landing locations and rolling of the body of the robotic device 900 within examples.

As previously indicated, the robotic device may include one or multiple sagittal controllers, which may be configured to work in the rolled robot frame and configured to preserve decoupling assumptions. The sagittal controllers and/or other controllers of the robotic device may determine various forces to apply within each stance of the robotic device 900 in a gait.

In some examples, the sagittal controller may be largely unaffected by banked turning. During a banked turn, the sagittal controller may compute state errors and apply impulses in the rolled reference frame. The sagittal controller may further adjust desired height and vertical velocity states to account for the increase in perceived gravitational acceleration due to the centripetal acceleration caused by a robotic device performing a turn.

In order to further balance during a turn, the robotic device may include one or more roll controllers and one or more lateral controllers that generate required inputs improving balance during banked turns. A roll controller may provide a roll torque input required tdo maintain the desired bank angle. A lateral controller may determine placement for the feet of the robotic device in lateral positions such that the vector between the feet and center of mass of the robotic device is aligned with the acceleration vector, for example. The lateral controller may also adjust the position of the feet such that the system can achieve the desired lateral velocity of the robotic device as well as the desired turn rate of the robotic device. These may be user inputs in some examples.

In some implementations, the control system of the robotic device 900 may use multiple factors when performing a bound or gallop gait. The control system may use momentum-resolved inverse kinematics and natural posture to position feet accurately during performance of the gait and to reduce sensitivity to internal motion for the robotic device. Further, the robotic device 900 may achieve additional maneuverability through the use of banked turning, adjusting the placement of the feet of the robotic device 900, and/or body posture to adapt to centripetal acceleration. Other examples may exist.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A method for operating a robotic device by a plurality of decoupled controllers of the robotic device including a discrete sagittal controller, a frontal model controller, and a turning controller, the method comprising:

receiving, at a computing system of a robotic device having a plurality of extendable legs, an input for the robotic device to perform a bound gait comprising a plurality of recurring gait stages that define respective positions for the extendable legs operating in predefined pairs, wherein the input indicates a velocity and direction of motion for the robotic device to travel;

responsive to receiving the input, determining a state of the robotic device based on sensor data indicative of operation of the extendable legs;

determining, by the discrete sagittal controller, vertical impulses and target locations for controlling the extendable legs during the bound gait based on a pitch, a height, and a velocity of the robotic device, wherein the target locations correspond to respective locations on a surface for landing the extendable legs, and wherein the pitch of the robotic device represents an orientation of the robotic device about a side axis of the robotic device;

determining, by the frontal model controller, one or more adjustments for controlling the extendable legs during the bound gait based on one or more lateral forces associated with a roll of the robotic device resulting from the robotic device traveling at the velocity and direction of motion according to the input;

modifying, by the turning controller, the target locations for controlling the extendable legs during the bound gait based on a yaw and a lateral motion of the robotic device resulting from the robotic device traveling at the velocity and direction of motion according to the input; and based on the state of the robotic device and the input, the plurality of decoupled controllers providing instructions to control the extendable legs operating in the predefined pairs to perform the bound gait.

2. The method of claim 1, wherein modifying, by the turning controller, the target locations for controlling the extendable legs during the bound gait comprises:

determining one or more new target locations having positions out from under the robotic device when the robotic device performs a turn during the bound gait, wherein the one or more target locations align the robotic device with an acceleration vector associated with performing the turn.

3. The method of claim 1, wherein determining, by the frontal model controller, one or more adjustments for controlling the extendable legs during the bound gait comprises:

determining respective adjustments that align the robotic device with an acceleration vector associated with the robotic device traveling at the velocity and direction of motion according to the input.

4. The method of claim 1, wherein determining, by the discrete sagittal controller, the vertical impulses is further based on respective forces associated with the extendable legs pushing off the surface during the bound gait, and wherein the discrete sagittal controller operates based on one or more multi-stage state space models.

5. The method of claim 1, wherein the state of the robotic device is indicative of a current velocity of the robotic device.

6. The method of claim 1, wherein determining the state of the robotic device based on sensor data indicative of operation of the extendable legs is further based on a momentum of the robotic device.

7. The method of claim 1, wherein the instructions to control the extendable legs operating in the predefined pairs to perform the bound gait includes a frequency for controlling the extendable legs between the plurality of recurring gait stages that define respective positions for the extendable legs operating in predefined pairs.

8. A robotic device comprising:

a plurality of extendable legs;

a sensor system for sensing operation of the extendable legs;

a computing system having a plurality of decoupled controllers including a discrete sagittal controller, a frontal model controller, and a turning controller; and a memory having stored thereon instructions that, upon execution by the plurality of decoupled controllers, cause the computing system to perform functions comprising:

receiving an input for the robotic device to perform a bound gait comprising a plurality of recurring gait stages that define respective positions for the extendable legs operating in predefined pairs, wherein the input indicates a velocity and direction of motion for the robotic device to travel;

responsive to receiving the input, determining a state of the robotic device based on sensor data indicative of operation of the extendable legs;

determining, by the discrete sagittal controller, vertical impulses and target locations for controlling the extendable legs during the bound gait based on a pitch, a height, and a velocity of the robotic device, wherein the target locations correspond to respective locations on a surface for landing the extendable legs, and wherein the pitch of the robotic device represents an orientation of the robotic device about a side axis of the robotic device;

determining, by the frontal model controller, one or more adjustments for controlling the extendable legs during the bound gait based on one or more lateral forces associated with a roll of the robotic device resulting from the robotic device traveling at the velocity and direction of motion according to the input;

modifying, by the turning controller, the target locations for controlling the extendable legs during the bound gait based on a yaw and a lateral motion of the robotic device resulting from the robotic device traveling at the velocity and direction of motion according to the input; and based on the state of the robotic device and the input, the plurality of decoupled controllers providing instructions to control the extendable legs operating in the predefined pairs to perform the bound gait.

9. The robotic device of claim 8, wherein the instructions to control the extendable legs operating in the predefined pairs to perform the bound gait includes respective control parameters for performing banked turns during the bound gait.

10. The robotic device of claim 8, wherein the frontal model controller is configured to roll the robotic device including shifting one or more feet of the robotic device away from one or more target positions under the robotic device when the robotic device is executing a turn.

11. The robotic device of claim 8, wherein respective gait stages in plurality of recurring gait stages that define respective positions for the extendable legs operating in predefined pairs include separate state space models with separate control gains for performing the bound gait.

12. A method for operating a robotic device by a plurality of decoupled controllers of the robotic device including a discrete sagittal controller and a lateral controller, the method comprising:

receiving, at a computing system of the robotic device having a plurality of extendable legs, an input for the robotic device to perform a gallop gait comprising a plurality of recurring gait stages that define respective positions for the extendable legs, wherein the input indicates a velocity and direction of motion for the robotic device to travel;

responsive to receiving the input, determining a state of the robotic device based on sensor data indicative of operation of the extendable legs;

determining, by the discrete sagittal controller, vertical impulses and target locations for controlling the extendable legs during the gallop gait based on a pitch, a height, and a velocity of the robotic device, wherein the target locations correspond to respective locations on a surface for landing the extendable legs, and wherein the pitch of the robotic device represents an orientation of the robotic device about a side axis of the robotic device;

determining, by the lateral controller, one or more adjustments for controlling the extendable legs during the gallop gait based on lateral forces associated with a roll, a yaw, and lateral motions of the robotic device that may result from the robotic device traveling at the velocity and direction according to the input; and based on the state of the robotic device and the input, the plurality of decoupled controllers providing instructions to control the extendable legs to perform the gallop gait.

13. The method of claim 12, wherein determining, by the lateral controller, one or more adjustments for controlling the extendable legs during the gallop gait comprises:

determining respective adjustments for the target locations for controlling the extendable legs during the gallop gait.

14. The method of claim 12, wherein determining, by the lateral controller, the one or more adjustments includes determining respective adjustments to convert one or more lateral forces on the robotic device into respective forward velocity forces on the robotic device.

15. The method of claim 12, wherein determining, by the lateral controller, the one or more adjustments for controlling the extendable legs during the gallop gait comprises:

determining respective adjustments for a heading angle of the robotic device during the gallop gait.

16. The method of claim 12, wherein determining, by the discrete sagittal controller, vertical impulses and target locations for controlling the extendable legs during the gallop gait is also based on motion of a base of the robotic device, and wherein the base of the robotic device corresponds to a center of gravity of the robotic device.

17. The method of claim 12, wherein the instructions to control the extendable legs to perform the gallop gait include respective velocities for operating one or more joints in the extendable legs based on a momentum of the robotic device.

18. The method of claim 12, wherein determining, by the discrete sagittal controller, vertical impulses and target locations for controlling the extendable legs during the gallop gait is further based on momentum-resolved inverse kinematics, and wherein the discrete sagittal controller operates based on one or more multi-stage state space models.

19. The method of claim 12, wherein determining, by the discrete sagittal controller, vertical impulses and target locations for controlling the extendable legs during the gallop gait is further based on a natural posture of the robotic device, wherein the natural posture of the robotic device represents a predetermined posture of the robotic device programmed into the computing system of the robotic device.

20. The method of claim 12, wherein the plurality of decoupled controllers providing instructions to control the extendable legs to perform the gallop gait includes instructions to perform a single step of a bound gait to transition the robotic device into performing the gallop gait.

* * * * *